(12) United States Patent
Boyd

(10) Patent No.: US 11,012,089 B1
(45) Date of Patent: May 18, 2021

(54) SYSTEM AND METHOD FOR ENCRYPTING AND COMPRESSING BLOCKS OF DATA

(71) Applicant: COLERIDGE DESIGN ASSOCIATES LLC, San Jose, CA (US)

(72) Inventor: Geoffrey Arthur Boyd, San Jose, CA (US)

( * ) Notice: Subject to any disclaimer, the term of this patent is extended or adjusted under 35 U.S.C. 154(b) by 335 days.

(21) Appl. No.: 15/987,894

(22) Filed: May 23, 2018

(51) Int. Cl.
*H03M 7/30* (2006.01)
*G06F 17/16* (2006.01)
*H04L 9/06* (2006.01)

(52) U.S. Cl.
CPC .............. *H03M 7/60* (2013.01); *G06F 17/16* (2013.01); *H04L 9/0637* (2013.01); *H04L 2209/30* (2013.01)

(58) Field of Classification Search
CPC ........ H03M 7/60; G06F 17/16; H04L 9/0637; H04L 2209/30
See application file for complete search history.

(56) References Cited

U.S. PATENT DOCUMENTS

| | | | | |
|---|---|---|---|---|
| 6,766,345 B2* | 7/2004 | Stein | ......................... | G06F 7/724 708/492 |
| 2007/0285285 A1* | 12/2007 | Puri | ...................... | H04N 19/129 341/50 |
| 2009/0003589 A1* | 1/2009 | Mathew | ................. | H04L 9/0631 380/28 |
| 2010/0303229 A1* | 12/2010 | Unruh | ................... | H04L 9/0643 380/28 |
| 2011/0202587 A1* | 8/2011 | Chabot | ............... | G06F 15/7867 708/492 |
| 2011/0206118 A1* | 8/2011 | Bivolarsky | .......... | H04N 19/147 375/240.12 |
| 2013/0173956 A1* | 7/2013 | Anderson | ............... | G06F 12/06 714/6.24 |
| 2017/0185529 A1* | 6/2017 | Chhabra | ............... | G06F 12/145 |
| 2017/0302436 A1* | 10/2017 | Alon | ..................... | H04L 9/0618 |

* cited by examiner

*Primary Examiner* — Samson B Lemma
*Assistant Examiner* — Zoha Piyadehghibi Tafaghodi
(74) *Attorney, Agent, or Firm* — Minisandram Law Firm; Raghunath S. Minisandram

(57) ABSTRACT

A system and method to encrypt a block of data is disclosed. A block of original data is retrieved from a data store, block of original data including a N number of words, each word including one or more bits of data. A multiplier matrix is provided, the multiplier matrix having NxN words, a plurality of sub matrices arranged diagonally within the NxN matrix, with each of the sub matrix arranged as a binomial matrix. All the words in the multiplier matrix not part of the sub matrix are set to zero. The block of original data is multiplied with the multiplier matrix to generate a block of modified original data with N number of words.

20 Claims, 22 Drawing Sheets

|     | 210 | 402 |     |
|-----|-----|-----|-----|
|     |     |     | \|d\| |
| 1   | 48  | s0  |     |
| 2   | -8  | d1  | 8   |
| 3   | 0   | d2  | 0   |
| 4   | 0   | d3  | 0   |
| 5   | 0   | d4  | 0   |
| 6   | 271 | s0  |     |
| 7   | -15 | d1  | 15  |
| 8   | -1  | d2  | 1   |
| 9   | 1   | d3  | 1   |
| 10  | -1  | d4  | 1   |
| 11  | 1   | d5  | 1   |
| 12  | 40  | s0  |     |
| 13  | 0   | d1  | 0   |
| 14  | 0   | d2  | 0   |
| 15  | 637 | s0  |     |
| 16  | 29  | d1  | 29  |
| 17  | -3  | d2  | 3   |
| 18  | -3  | d3  | 3   |
| 19  | -3  | d4  | 3   |
| 20  | -3  | d5  | 3   |
| 21  | -3  | d6  | 3   |
| 22  | 36  | s0  |     |
| 23  | 4   | d1  | 4   |
| 24  | 0   | d2  | 0   |
| 25  | 0   | d3  | 0   |
| 26  | 20  | s0  |     |
| 27  | -2  | d1  | 2   |
| 28  | 0   | d2  | 0   |

Row

AGGREGATE ENERGY = 2.78

| Row | Value | Label |
|---|---|---|
| 1 | 48 | s0 |
| 2 | -8 | d1 |
| 3 | 0 | d2 |
| 4 | 0 | d3 |
| 5 | 0 | d4 |
| 6 | 128 | s0 |
| 7 | -8 | d1 |
| 8 | 0 | d2 |
| 9 | 0 | d3 |
| 10 | 0 | d4 |
| 11 | 80 | s0 |
| 12 | 0 | d1 |
| 13 | 0 | d2 |
| 14 | 0 | d3 |
| 15 | 637 | s0 |
| 16 | 29 | d1 |
| 17 | -3 | d2 |
| 18 | -3 | d3 |
| 19 | -3 | d4 |
| 20 | -3 | d5 |
| 21 | -3 | d6 |
| 22 | 36 | s0 |
| 23 | 4 | d1 |
| 24 | 0 | d2 |
| 25 | 0 | d3 |
| 26 | 20 | s0 |
| 27 | -2 | d1 |
| 28 | 0 | d2 | 0 |

AGGREGATE ENERGY = 2.69

FIGURE 6A 508-2

| Row | Value | Label |
|---|---|---|
| 1 | 48 | s0 |
| 2 | -8 | d1 |
| 3 | 0 | d2 |
| 4 | 0 | d3 |
| 5 | 0 | d4 |
| 6 | 60 | s0 |
| 7 | -4 | d1 |
| 8 | 0 | d2 |
| 9 | 0 | d3 |
| 10 | 160 | s0 |
| 11 | 0 | d1 |
| 12 | 0 | d2 |
| 13 | 0 | d3 |
| 14 | 0 | d4 |
| 15 | 637 | s0 |
| 16 | 29 | d1 |
| 17 | -3 | d2 |
| 18 | -3 | d3 |
| 19 | -3 | d4 |
| 20 | -3 | d5 |
| 21 | -3 | d6 |
| 22 | 36 | s0 |
| 23 | 4 | d1 |
| 24 | 0 | d2 |
| 25 | 0 | d3 |
| 26 | 20 | s0 |
| 27 | -2 | d1 |
| 28 | 0 | d2 |

AGGREGATE ENERGY = 2.69

FIGURE 7A

| Row | 508-3 | |
|---|---|---|
| 1 | 48 | s0 |
| 2 | -8 | d1 |
| 3 | 0 | d2 |
| 4 | 0 | d3 |
| 5 | 0 | d4 |
| 6 | 28 | s0 |
| 7 | -2 | d1 |
| 8 | 0 | d2 |
| 9 | 319 | s0 |
| 10 | -1 | d1 |
| 11 | -1 | d2 |
| 12 | -1 | d3 |
| 13 | -1 | d4 |
| 14 | -1 | d5 |
| 15 | 637 | s0 |
| 16 | 29 | d1 |
| 17 | -3 | d2 |
| 18 | -3 | d3 |
| 19 | -3 | d4 |
| 20 | -3 | d5 |
| 21 | -3 | d6 |
| 22 | 36 | s0 |
| 23 | 4 | d1 |
| 24 | 0 | d2 |
| 25 | 0 | d3 |
| 26 | 20 | s0 |
| 27 | -2 | d1 |
| 28 | 0 | d2 |

AGGREGATE ENERGY = 2.84

508-4

| Row | Value | Label |
|---|---|---|
| 1 | 48 | s0 |
| 2 | -8 | d1 |
| 3 | 0 | d2 |
| 4 | 0 | d3 |
| 5 | 0 | d4 |
| 6 | 60 | s0 |
| 7 | -4 | d1 |
| 8 | 0 | d2 |
| 9 | 0 | d3 |
| 10 | 160 | s0 |
| 11 | 0 | d1 |
| 12 | 0 | d2 |
| 13 | 0 | d3 |
| 14 | 0 | d4 |
| 15 | 637 | s0 |
| 16 | 29 | d1 |
| 17 | -3 | d2 |
| 18 | -3 | d3 |
| 19 | -3 | d4 |
| 20 | -3 | d5 |
| 21 | -3 | d6 |
| 22 | 36 | s0 |
| 23 | 4 | d1 |
| 24 | 0 | d2 |
| 25 | 0 | d3 |
| 26 | 20 | s0 |
| 27 | -2 | d1 |
| 28 | 0 | d2 |

AGGREGATE ENERGY = 2.69

FIGURE 9A 508-5

| Row | Value | Label |
|---|---|---|
| 1 | 48 | s0 |
| 2 | -8 | d1 |
| 3 | 0 | d2 |
| 4 | 0 | d3 |
| 5 | 0 | d4 |
| 6 | 60 | s0 |
| 7 | -4 | d1 |
| 8 | 0 | d2 |
| 9 | 0 | d3 |
| 10 | 320 | s0 |
| 11 | 0 | d1 |
| 12 | 0 | d2 |
| 13 | 0 | d3 |
| 14 | 0 | d4 |
| 15 | 0 | d5 |
| 16 | 304 | s0 |
| 17 | 16 | d1 |
| 18 | 0 | d2 |
| 19 | 0 | d3 |
| 20 | 0 | d4 |
| 21 | 0 | d5 |
| 22 | 36 | s0 |
| 23 | 4 | d1 |
| 24 | 0 | d2 |
| 25 | 0 | d3 |
| 26 | 20 | s0 |
| 27 | -2 | d1 |
| 28 | 0 | d2 |

AGGREGATE ENERGY = 2.5

| Row | Value | Label |
|---|---|---|
| 1 | 48 | s0 |
| 2 | -8 | d1 |
| 3 | 0 | d2 |
| 4 | 0 | d3 |
| 5 | 0 | d4 |
| 6 | 60 | s0 |
| 7 | -4 | d1 |
| 8 | 0 | d2 |
| 9 | 0 | d3 |
| 10 | 642 | s0 |
| 11 | -2 | d1 |
| 12 | 2 | d2 |
| 13 | -2 | d3 |
| 14 | 2 | d4 |
| 15 | -2 | d5 |
| 16 | 2 | d6 |
| 17 | 144 | s0 |
| 18 | 8 | d1 |
| 19 | 0 | d2 |
| 20 | 0 | d3 |
| 21 | 0 | d4 |
| 22 | 36 | s0 |
| 23 | 4 | d1 |
| 24 | 0 | d2 |
| 25 | 0 | d3 |
| 26 | 20 | s0 |
| 27 | -2 | d1 |
| 28 | 0 | d2 |

AGGREGATE ENERGY = 2.69

FIGURE 11A

| Row | 1202 | | Row | 208 |
|---|---|---|---|---|
| 1 | 16 | | 1 | 1 |
| 2 | 32 | | 2 | 2 |
| 3 | 48 | | 3 | 3 |
| 4 | 64 | | 4 | 4 |
| 5 | 80 | | 5 | 5 |
| 6 | 48 | | 6 | 6 |
| 7 | 56 | | 7 | 7 |
| 8 | 64 | | 8 | 8 |
| 9 | 72 | | 9 | 9 |
| 10 | 320 | | 10 | 10 |
| 11 | 320 | | 11 | 10 |
| 12 | 320 | | 12 | 10 |
| 13 | 320 | | 13 | 10 |
| 14 | 320 | | 14 | 10 |
| 15 | 320 | | 15 | 10 |
| 16 | 384 | | 16 | 12 |
| 17 | 352 | | 17 | 11 |
| 18 | 320 | | 18 | 10 |
| 19 | 288 | | 19 | 9 |
| 20 | 256 | | 20 | 8 |
| 21 | 224 | | 21 | 7 |
| 22 | 48 | | 22 | 6 |
| 23 | 40 | | 23 | 5 |
| 24 | 32 | | 24 | 4 |
| 25 | 24 | | 25 | 3 |
| 26 | 16 | | 26 | 4 |
| 27 | 20 | | 27 | 5 |
| 28 | 24 | | 28 | 6 |

FIGURE 12A $$1302 \sim \begin{bmatrix} 1 & 2 & 3 & 4 & 5 \\ 1 & 4 & 6 & 4 & 1 \\ 1 & 2 & 0 & -2 & -1 \\ 1 & 0 & -2 & 0 & 1 \\ 1 & -2 & 0 & 2 & -1 \\ 1 & -4 & 6 & -4 & 1 \end{bmatrix} \times 1304 \sim \begin{bmatrix} 33 \\ 253 \\ 51 \\ 12 \\ 147 \end{bmatrix} = 1306 \sim \begin{bmatrix} 1546 \\ 368 \\ 78 \\ -596 \\ -574 \end{bmatrix}$$

FIGURE 13

SYSTEM AND METHOD FOR ENCRYPTING AND COMPRESSING BLOCKS OF DATA

RELATED APPLICATION

None

TECHNICAL FIELD

The present invention relates generally to encryption and compression of data and more specifically, encryption and compression of blocks of data.

DESCRIPTION OF RELATED ART

Information in the form of data is generally transferred from a source device to a destination device. In some examples, the information may be transferred as blocks of data. As the value of the information increases, there is a need to protect the information during a storage phase (sometimes referred to as "data at rest"), when the information is stored in a data store. Further, in some examples, there is a need to protect the information during a transmission phase, when the information is transmitted from one location or a source to another location or a destination (sometimes referred to as "data in transit").

It may be beneficial to provide an encryption system to encrypt the information in the form of data blocks. In some examples, it may also be beneficial to encrypt the data in a form that is conducive to better compression, for example, providing an improved compression ratio.

With these needs in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE INVENTION

In one embodiment, a method to encrypt a block of data is disclosed. A block of original data is retrieved from a data store, block of original data including a N number of words, each word including one or more bits of data. A multiplier matrix is provided. The multiplier matrix has N×N words, a plurality of sub matrices arranged diagonally within the N×N matrix, with each of the sub matrix arranged as a binomial matrix, and all the words in the multiplier matrix not part of the sub matrix is set to zero. The block of original data is multiplied with the multiplier matrix to generate a block of modified original data with N number of words.

In another embodiment, a system to encrypt a block of data is disclosed. An encryption engine is configured to retrieve a block of original data from a data store, block of original data including a N number of words, each word including one or more bits of data. A multiplier matrix is provided. The multiplier matrix has N×N words, a plurality of sub matrices arranged diagonally within the N×N matrix, with each of the sub matrix arranged as a binomial matrix, and all the words in the multiplier matrix not part of the sub matrix is set to zero. The block of original data is multiplied with the multiplier matrix to generate a block of modified original data with N number of words.

This brief summary is provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are described with reference to the drawings. In the drawings, the same components have the same reference numerals. The illustrated embodiments are intended to illustrate but not limit the invention. The drawings include the following figures:

FIG. 4 shows the example modified original data matrix of FIG. 3, with corresponding aggregate energy of the modified original data matrix, according to an aspect of the present disclosure;

FIGS. 6A, 7A, 8A, 9A, 10A and 11A shows example interim modified original data matrix of FIGS. 6, 7, 8, 9, 10 and 11 respectively, along with corresponding aggregate energy of the interim modified original data matrix, according to an aspect of the present disclosure;

FIG. 12A shows an example interim original data matrix of FIG. 12 and regenerated original data matrix, according to an aspect of the present disclosure;

FIG. 13 shows another example sub matrix multiplication, according to an aspect of the present disclosure;

DETAILED DESCRIPTION

To facilitate an understanding of the adaptive aspects of the present disclosure, an example encryption system will be described. The specific construction and operation of the adaptive aspects of various elements of the example encryption system will be further described with reference to the encryption system.

Figure 1:
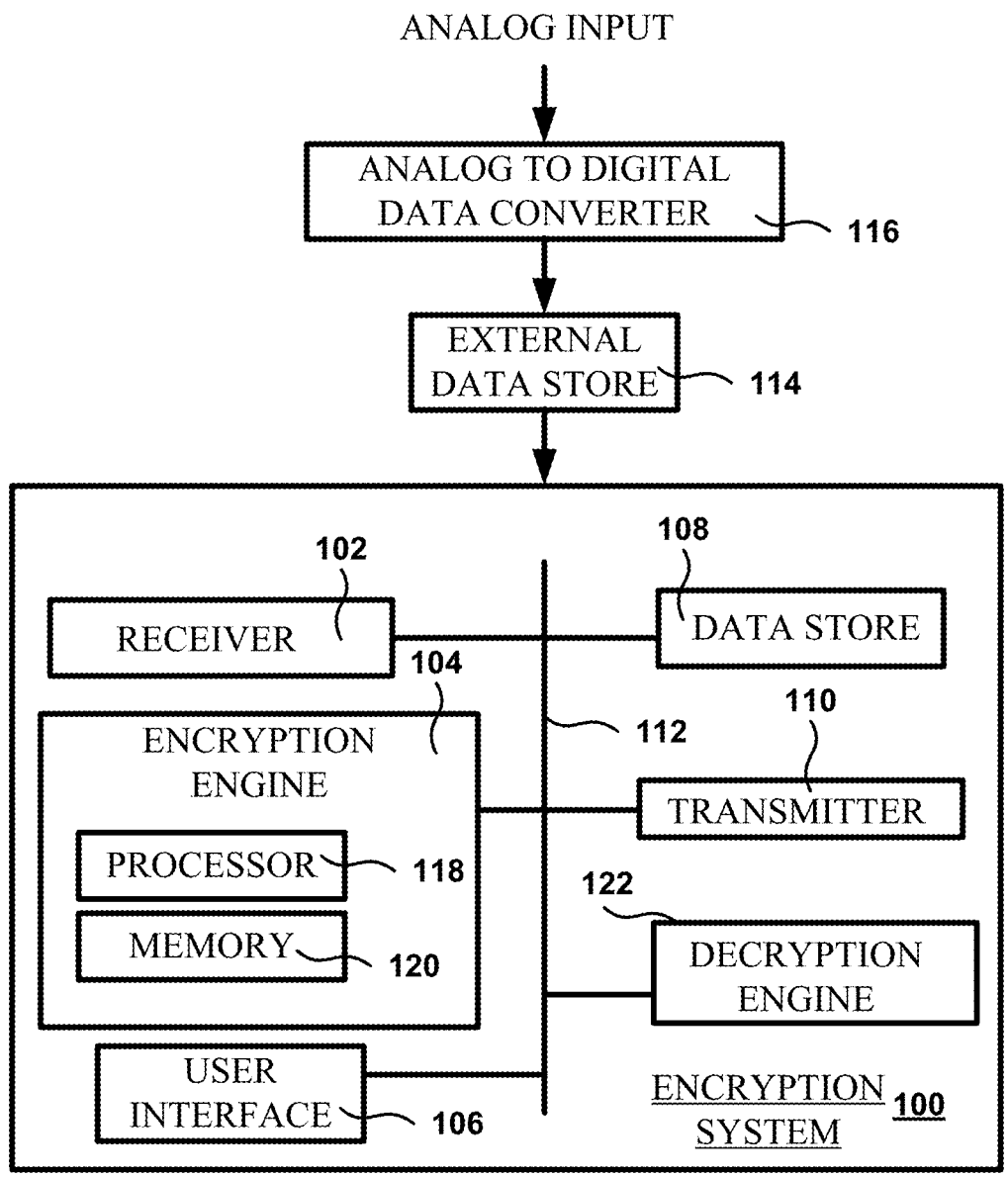
FIG. 1 shows an example encryption system, according to one aspect of the present disclosure.

FIG. 1 shows an example block diagram of an encryption system 100. The encryption system 100 includes a receiver 102, an encryption engine 104, a user interface 106, a data store 108 and a transmitter 110, all configured to communicate with each other over a bus 112. In one example, the encryption system 100 further includes a decryption engine 122. The encryption system 100 may be part of a computing system (not shown) with various computing, storage, input and output devices.

The receiver 102 may be configured to receive data from a source, for example, a source external to the encryption system 100. In one example, the receiver may receive one or more blocks of data. In one example, the receiver 102 may be configured to receive or retrieve one of more blocks of data from an external data store 114. In one example, the blocks of data may correspond to an audio or visual data stored in a digital form. In one example, the audio or video data may initially be in an analog data form, which has been converted to digital data form, for example, by an analog to digital converter 116.

The encryption engine 104 includes a processor 118 and a memory 120. The processor 118 may be configured to perform various arithmetic and logical computations. The memory 120 may be used to store and retrieve various transient and permanent data to be used by the encryption engine 104. The decryption engine 122 may be similar to the encryption engine and may include a processor and a memory (not shown) and perform similar to the encryption engine, however, decrypt the input data encrypted by the encryption engine 104. Further functions and features of the encryption engine 104 and decryption engine 122 will be later described with reference to FIG. 2, 2A and various example implementations described in this disclosure.

User interface 106 may be configured to provide a user access to various functions and features of the encryption system 100. In some examples, the user interface 106 may interact with an input device or an output device, to provide an interface to communicate with the encryption system 100. In one example, the user interface 106 may provide access to various administrative functions of the encryption system 100. In some examples, the user interface 106 may provide access to set up and configuration fields of the encryption system 100. In some examples, the user interface 106 may provide access to the encryption system 100 over a web interface.

The data store 108 may be used to store transient and permanent data. In one example, the data store 108 may be used by various other elements of the encryption system 100 to store transient and permanent data.

The transmitter 110 is configured to transmit data from the encryption system 100. For example, the transmitter 100 may transmit the data processed by the encryption system 100 to other systems or components configured to receive the data. In one example, the transmitted 100 may format the data to be transmitted in one or more predefined formats so that other systems or components that receive the data understand the data so received.

Figure 2:
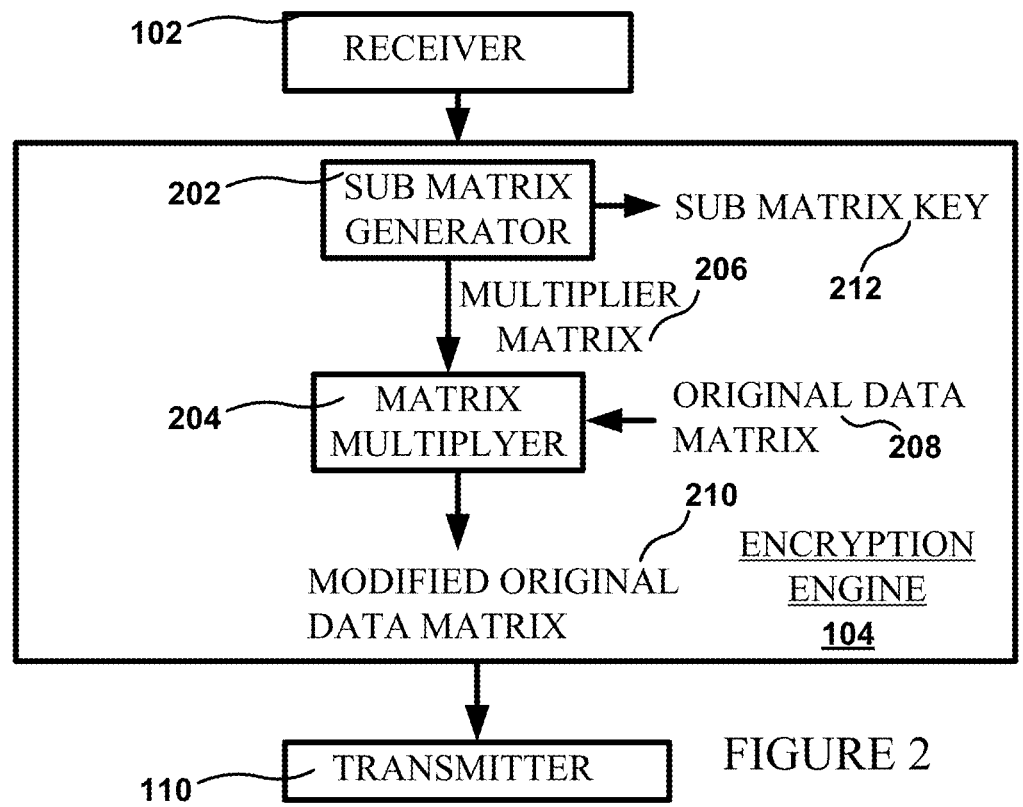
FIG. 2 shows an example encryption engine of the encryption system of FIG. 1, according an aspect of the present disclosure.

Now, referring to FIG. 2, an example encryption engine 104 will be further described. The encryption engine 104 includes a sub matrix generator 202 and a matrix multiplier 204. In one example, the sub matrix generator 202 is configured to generate a plurality of sub matrices. The plurality of sub matrices are selectively arranged to form a multiplier matrix 206. Details of the sub matrices and selective arrangement of the sub matrices to form the multiplier matrix 206 will be described later in detail. In one example, the multiplier matrix 206 may have N×N number of words. In one example, each word may include one or more number of bits. In one example, selective arrangement of the characteristics of the sub matrices may form a sub matrix key 212. In one example, the sub matrix generator 202 generates the sub matrix key 212. In one example, the sub matrix key 212 may be used to generate the multiplier matrix 206, which will be described later.

The matrix multiplier 204 is configured to perform a matrix multiplication of a received data with the multiplier matrix 206. In one example, the received block of data from the receiver 102 may be arranged in the form of a matrix with N×1 number of words. In one example, each word may include one or more number of bits. For convenience, the received block of data arranged in a matrix form will be sometimes referred to as an original data matrix 208.

In one example, the matrix multiplier 204 receives the multiplier matrix 206 and the original data matrix 208 and performs a matrix multiplication of the multiplier matrix and the original data matrix to generate a modified original data matrix 210. In one example, the modified original data matrix 210 will have N×1 number of words.

In one example, the modified original data matrix 210 is representative of the original data matrix 208 in an anonymized form. In one example, if a matrix multiplication of the modified original data 210 is performed with the multiplier matrix 206, the result of the matrix multiplication will generate or reproduce the original data matrix 208. So, in one example, the modified original data matrix 210 may represent the anonymized original data matrix 208.

In one example, the modified original data matrix 210 may be transmitted to a destination computing device by the transmitter 110. The destination computing device may recreate the original data matrix by performing a matrix multiplication of the modified original data matrix 210 with the multiplier matrix 206, for example, using the decryption engine 122.

Figure 2A:
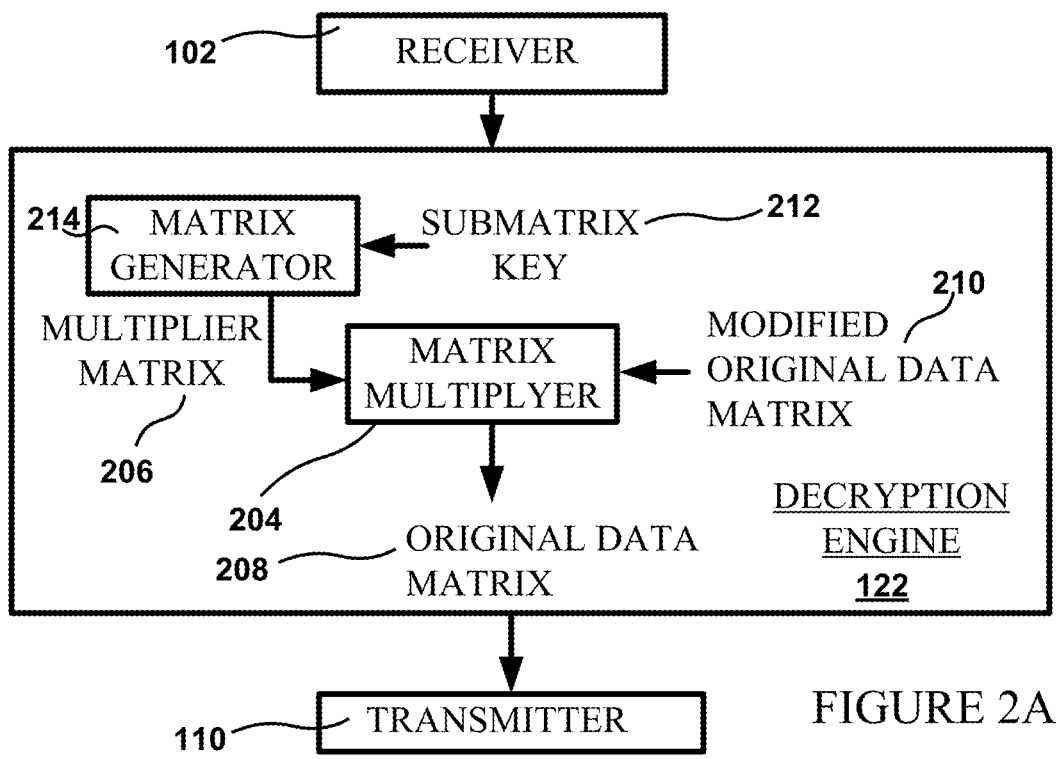
FIG. 2A shows an example decryption engine of the encryption system of FIG. 1, according to an aspect of the present disclosure.

An example decryption engine 122 is described with reference to FIG. 2A. The receiver 102 receives the modified original data matrix 206. The multiplier matrix 204 receives the modified original data matrix 206 and the matrix multiplier 206. In one example, knowing the characteristics of the sub matrices may help in regenerating the multiplier matrix 206. In one example, selective arrangement of the characteristics of the sub matrices may form a sub matrix key 212. In one example, the sub matrix key may be used to generate the multiplier matrix 206. For example, the matrix generator 214 may receive the sub matrix key 212 as input and generate the multiplier matrix 206 as output. The matrix multiplier 204 multiplies the modified original data matrix 210 with the matrix multiplier 206 to generate the original data matrix 208. The original data matrix 208 is transmitted by the transmitter 208 for further processing. In some examples, the sub matrix key 212 may be referred to as an encryption key. These will be further described in detail, using one or more examples.

Figure 3:
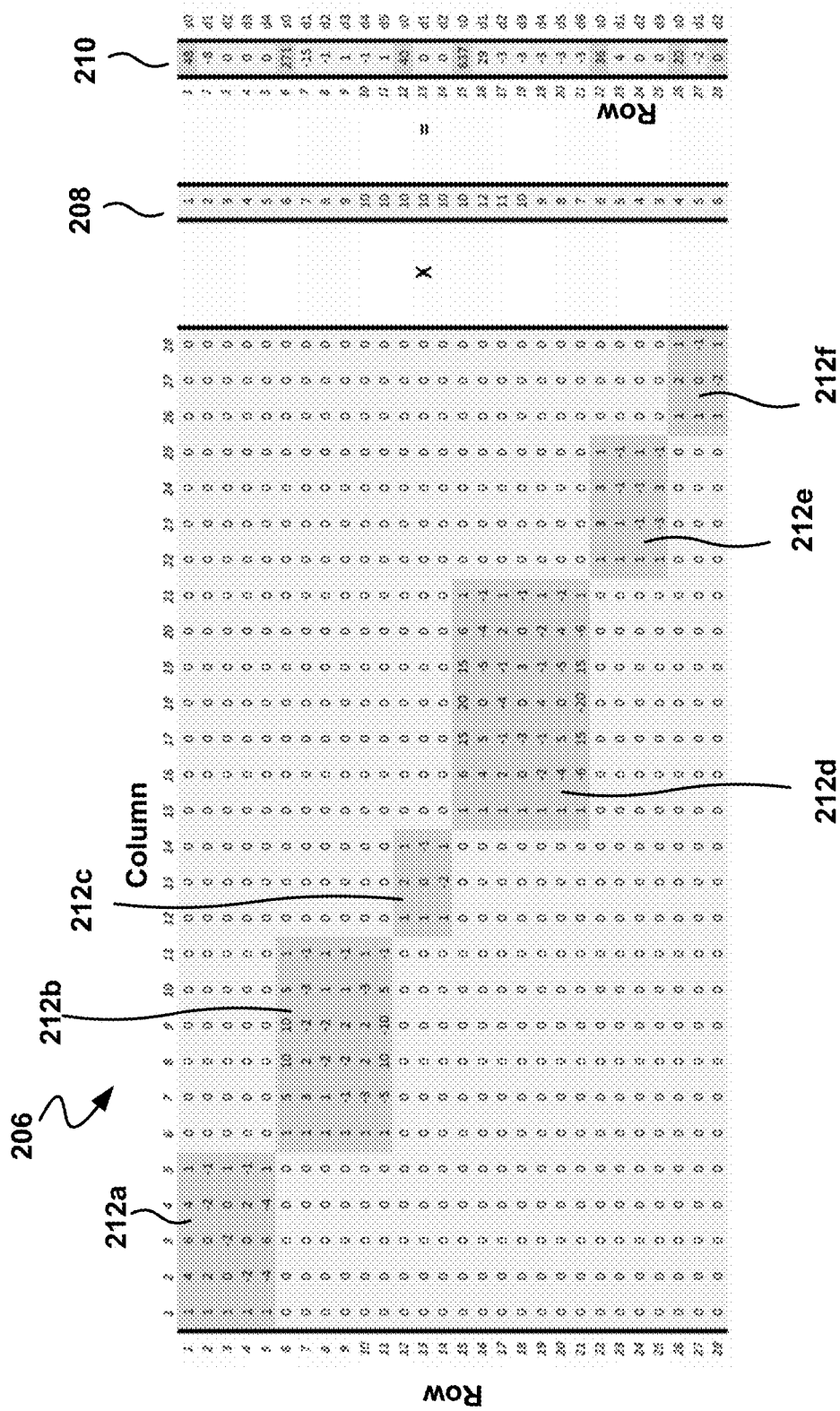
FIG. 3 shows an example multiplier matrix, original data matrix and the modified original data matrix, according to an aspect of the present disclosure.

Now, referring to FIG. 3, an example multiplier matrix 206 is described. In this example, the multiplier matrix 206 is a 28×28 matrix. In other words, 28 rows and 28 columns of data define the multiplier matrix 206. Each element of the multiplier matrix may be referred to as an element E i,j, where, i represents the row number and j represents the column number for the element. As an example, the value of element E 5,4 is −4 and value of E 6,5 is a zero. The multiplier matrix 206 has a plurality of sub matrices arranged diagonally within the 28×28 matrix. In this example, there are six sub matrices, 212a, 212b, 212c, 212d, 212e and 212f. The sub matrices n×n in this example, are arranged as a binomial matrix Bn, with n indicative of number of rows and columns in the binomial matrix. In one example, all elements of the multiplier matrix that is not part of a sub matrix is set to zero.

As one skilled in the art appreciates, a binomial matrix B1 will have a value of {{1}}. A binomial matrix B2 will have a value of {{1,1},{1,−1}}. A binomial matrix B3 will have a value of {{1,2,1}, {1,0,−1} and {1,−2,1}}. A binomial matrix B4 will have a value of {{1,3,3,1}, {1,1,−1,−1}, {1,−1,−1,1} and {1,−3,3,−1}}. A binomial matrix B5 will have a value of {{1,4,6,4,1}, {1,2,0,−2,−1}, {1,0,−2,0,1}, {1,−2,0,2,−1}, and {1,−4,6,−4,1}}. A binomial matrix B6 will have a value of {{1,5,10,10,5,1},{1,3,2,−2,−3,−1},{1,2,−2,−2,1,1}, {1,−1,02,2,1,−1}, {1,−3,3,3,−3,1}, and {1,−5,10,−10,5,−1}}. A binomial matrix B7 will have a value of {{1,6,15,20,15,6,1},{1,4,5,0,−5,−4,−1},{1,2,−1,−4,−1,2,1}, {1,0,−3,0,3,0,−1},{1,−2,−1,4,−1,−2,1},{1,−4,5,0,−5,4,−1}, and {1,−6,15,−20,15,−6,1}}. A binomial matrix B8 will have a value of {{1,7,21,35,35,21,7,1}, {1,5,9,5,−5,−9,−5,−1}, {1,3,1,−5,−5,1,3,1},{1,1,−3,−3,3,3,−1,−1},{1,−1,−3,3,3,−3,1,1},{1,−3,1,5,−5,−1,3,−1},{1,−5,9,−5,−5,9,−5,1}, and {1,−7,21,−35,35,−21,7,−1}}.

Now, referring back to FIG. 3, we notice that the sub matrix 212a is a binomial matrix B5, sub matrix 212b is a binomial matrix B6, sub matrix 212c is a binomial matrix B3, sub matrix 212d is a binomial matrix B7, sub matrix 212e is a binomial matrix B4 and sub matrix 212f is a binomial matrix B3.

FIG. 3 also shows the original data matrix 208. In this example, the original data matrix 208 is a 28×1 matrix. FIG. 3 also shows the modified original data matrix 210, which is derived by performing a matrix multiplication of the multiplier matrix 206 and original data matrix 208. As one skilled in the art appreciates, the modified original data matrix 210 is a 28×1 matrix.

In one example, the size or dimension of the sub matrices 212a, 212b, 212c, 212d, 212e and 212f may be used as an encryption key. In one example, a sequential arrangement of the dimension of the sub matrices may represent an encryption key. In this example, the encryption key will be 563743. In some example, the encryption key may be an obfuscated sequence of the dimension of the sub matrix key. As an example, dimensions of the odd sub matrices may be arranged sequentially, followed by dimensions of the even sub matrices. This may yield an encryption key of 534673.

As one skilled in the art appreciates, various combinations of the dimensions of the sub matrices may be arranged to define an encryption key. Once the encryption key is decoded, the dimensions of the sub matrices are retrieved. Once the dimensions of the sub matrices are retrieved the multiplier matrix may be recreated. As previously described, by performing a matrix multiplication of the multiplier matrix with the modified original data matrix will generate the original data matrix. This will be further described in detail later.

Compression:

Now, referring to FIG. 4, modified original data matrix 210 is shown and further described. Now, observing the modified original data matrix 210, we notice that each sub matrix when multiplied with corresponding portion of the original data matrix 208 generates a scalar coefficient represented as S0 and a plurality of wavelet coefficients represented as d1, d2, d3 and so on. The scalar coefficient S0 is sometimes referred to as a weighted average coefficient. The wavelet coefficients d1, d2, d3 and so on is sometimes referred to as a differential coefficient. For example, the elements E 1,1 to E 5,1 of the modified original data matrix 210 correspond to the sub matrix 212a, elements E 6,1 to E 11,1 correspond to sub matrix 212b, elements E 12,1 to E 14,1 correspond to sub matrix 212c, elements E 15,1 to E 21, 1 correspond to sub matrix 212d, elements E 22,1 to E 25, 1 correspond to sub matrix 212e and elements E 26,1 to E 28,1 correspond to sub matrix 212f. In this example, elements E 1,1, E 6,1, E 12,1, E 15,1, E 22,1 and E 26,1 represent a scalar coefficient or weighted average coefficient. Other elements represent the wavelet coefficients or differential coefficients. For example, elements E 2,1 to E 5,1 represent wavelet coefficient or differential coefficient corresponding to sub matrix 212a. Similarly, elements E 7, 1 to E 11, 1 represent wavelet coefficient or differential coefficient corresponding to sub matrix 212b.

In one example, an aggregate energy for the modified original data matrix 210 is calculated. The aggregate energy is a sum of all of the sub energy for portions of the modified original data matrix 210 that corresponds to a sub matrix. The sub energy for a portion of the modified data matrix 210 that corresponds to a sub matrix is calculated by dividing the sum of the modulus of the differential coefficients by a square of the number of differential coefficients in the sub matrix. For example, column 402 shows various modulus of the differential coefficients.

As an example, the sum of the modulus of the differential coefficients for portion of the modified original data matrix 210 represented by elements E 1,1 to E 5,1 is 8. Number of differential coefficients is 4. The sub energy for this portion of the modified original data matrix 210 is 0.5.

Similarly, the sum of the modulus of the differential coefficients for portion of the modified original data matrix 210 represented by elements E 6,1 to E 11,1 is 19. Number of differential coefficients is 5. The sub energy for this portion of the modified original data matrix 210 is 0.59.

Similarly, the sum of the modulus of the differential coefficients for portion of the modified original data matrix 210 represented by elements E 12,1 to E 14,1 is 0. Number of differential coefficients is 2. The sub energy for this portion of the modified original data matrix 210 is 0.

Similarly, the sum of the modulus of the differential coefficients for portion of the modified original data matrix 210 represented by elements E 15,1 to E 21,1 is 44. Number of differential coefficients is 6. The sub energy for this portion of the modified original data matrix 210 is 0.69.

Similarly, the sum of the modulus of the differential coefficients for portion of the modified original data matrix 210 represented by elements E 22,1 to E 25,1 is 4. Number of differential coefficients is 3. The sub energy for this portion of the modified original data matrix 210 is 0.5.

Similarly, the sum of the modulus of the differential coefficients for portion of the modified original data matrix 210 represented by elements E 26,1 to E 28,1 is 2. Number of differential coefficients is 2. The sub energy for this portion of the modified original data matrix 210 is 0.5.

Now, adding all the calculated sub energies, we get an aggregate energy for the modified original data matrix 210 is 0.5+0.59+0.69+0.5+0.5=2.78. In one example, it may be preferable to selectively change the dimension of the sub matrices of the multiplier matrix to generate a modified original data matrix 210 with minimal amount of aggregate energy. Such a modified original data matrix 210 with minimal amount of aggregate energy may indicate values in the modified original data matrix 210 that may yield a better compression efficiency, if the modified original data matrix 210 is compressed prior to transmission or storage. In one example, when the aggregate energy tends to be lower, the value of a maximum number of elements are zero. Such a matrix with a plurality of element value of zero is conducive for better compression. Another example encryption engine 104a will now be described with reference to FIG. 5.

Figure 5:
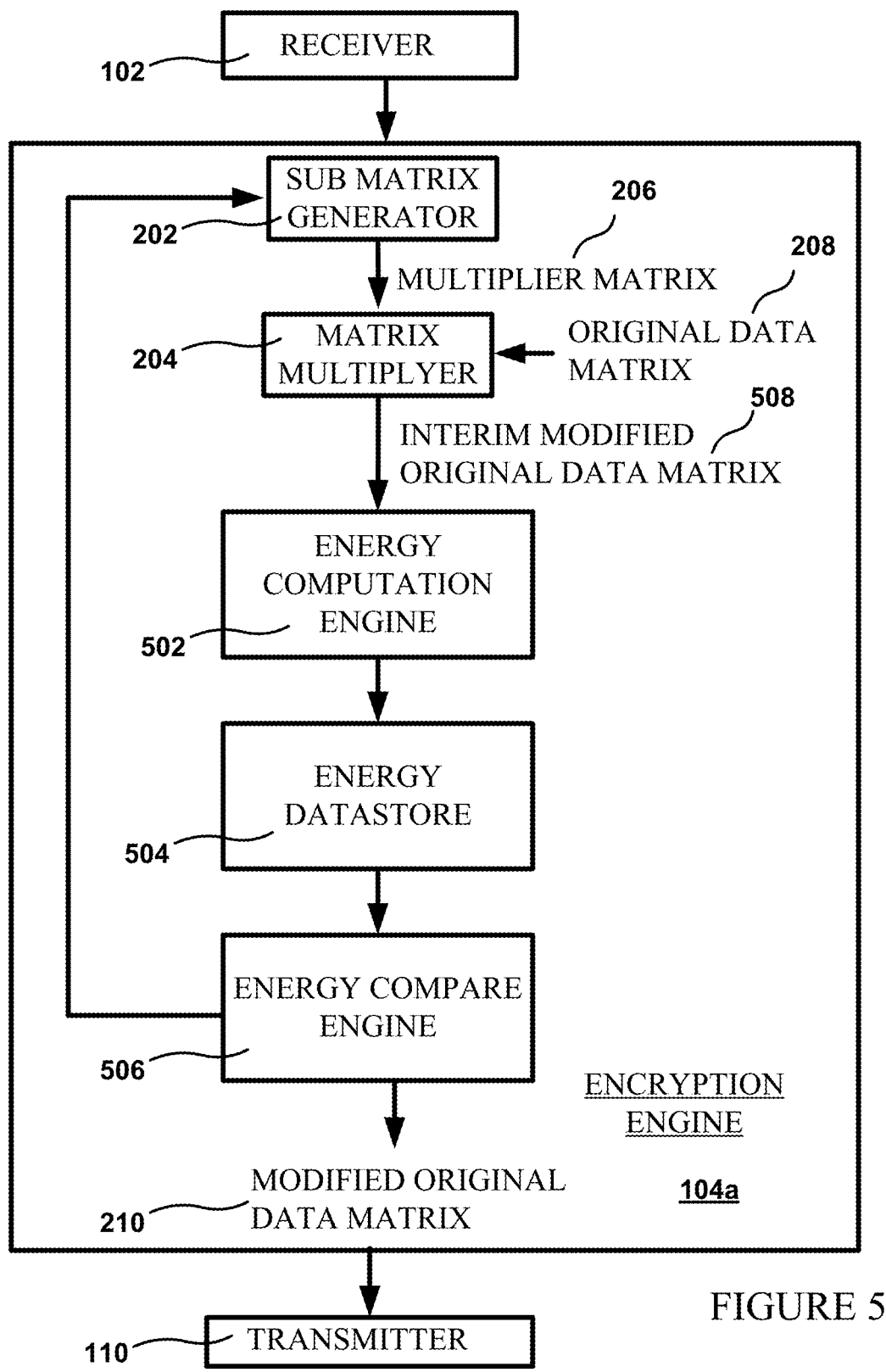
FIG. 5 shows an alternate example encryption engine, according to an aspect of the present disclosure.

Now, referring to FIG. 5, another example encryption engine 104a is described. In some examples, the encryption engine 104a may be similar to encryption engine 104 previously described with reference to FIG. 2 and may be part of the encryption system 100 previously described with reference to FIG. 1.

The encryption engine 104a includes a sub matrix generator 202, a matrix multiplier 204, energy computation engine 502, energy data store 504 and an energy compare engine 506. The sub matrix generator 202 is configured to generate one or more multiplier matrix 206, as previously described with reference to FIG. 2 and FIG. 3. The matrix multiplier 204 is configured to receive the multiplier matrix 206 and original data matrix 208 and perform a matrix multiplication and generate an output matrix, as previously described with reference to FIG. 2 and FIG. 3. In this example, the output matrix is designated as an interim modified original data matrix 508.

In one example, a plurality of interim modified original data matrix 508 may be generated by using a plurality of multiplier matrix 206 generated by the sub matrix generator 202. For example, a plurality of multiplier matrix 206 may be generated by selectively changing the dimensions of the plurality of sub matrices that form the multiplier matrix.

The interim modified original data matrix 508 is similar to the modified original data matrix 210 described with reference to FIG. 2, FIG. 3 and FIG. 4. For example, an aggregate energy for the interim modified original data matrix 508 may be calculated as described with reference to FIG. 4. As an example, the energy computation engine 502 may be configured to calculate the aggregate energy for the interim modified original data matrix 508, as previously described with reference to FIG. 4.

Calculated aggregate energy for a plurality of interim modified original data matrix 508 is stored in the energy data store 504. The energy compare engine compares the aggregate energy for each of the plurality of interim modified original data matrix 508 and selects one of the interim modified original data matrix with minimal amount of aggregate energy. The selected one of the interim modified original data matrix is output as the modified original data matrix 210 in this example. As previously described with reference to FIG. 2 and FIG. 3, the dimensions of the sub matrix corresponding to the multiplier matrix that generated minimal amount of aggregate energy is selectively arranged to form an encryption key for the modified original data matrix 210.

Now, an example of various multiplier matrices, corresponding interim modified original data matrix, corresponding aggregate energy and selection of one of the interim modified original data matrix based on the minimal aggregate energy will now be described by using FIGS. 6, 6A, 7, 7A, 8, 8A, 9, 9A, 10, 10A, 11 and 11A.

Figure 6:
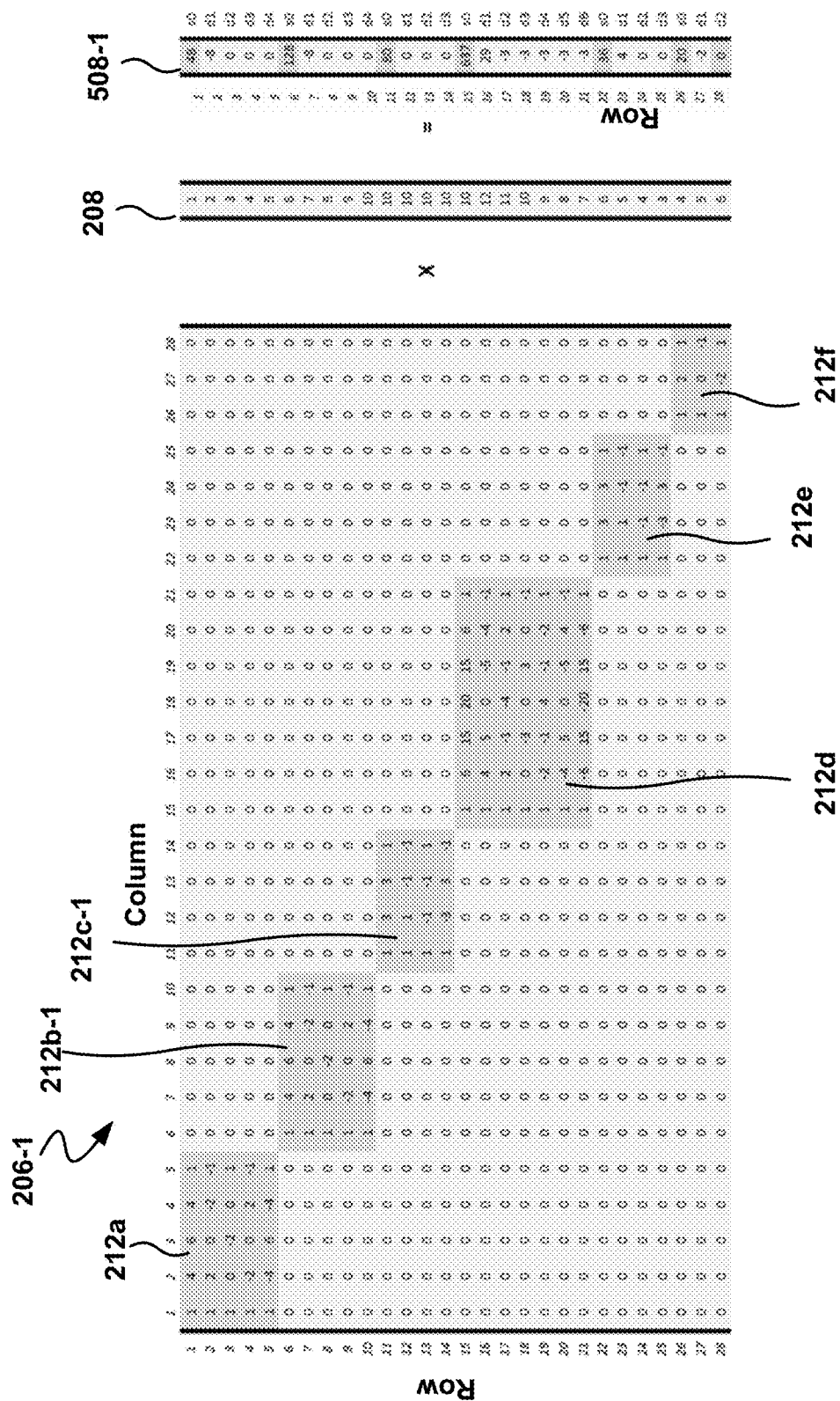
FIGS. 6, 7, 8, 9, 10 and 11 shows alternate examples of multiplier matrix, original data matrix and corresponding interim modified original data matrix, according to an aspect of the present disclosure, according to an aspect of the present disclosure.

Now, referring to FIG. 6, an example multiplier matrix 206-1 is shown. The multiplier matrix 206-1 is similar to multiplier matrix 206 shown in FIG. 3, except that one or more of the sub matrix dimensions are different. In this example, the sub matrix 212b-1 has a dimension of 5×5 and the sub matrix 212C-1 has a dimension of 4×4. The multiplier matrix 206-1 is matrix multiplied with the original data matrix 208 to generate an interim modified original data matrix 508-1. FIG. 6A shows various weighted average coefficients and differential coefficients of the interim modified original data matrix 508-1 and the corresponding aggregate energy of the interim modified original data matrix 508-1. In this example, the aggregate energy of the interim modified original data matrix 508-1 is 2.69. Further, number of zeros in the interim modified original data matrix 508-1 is 12.

Figure 7:
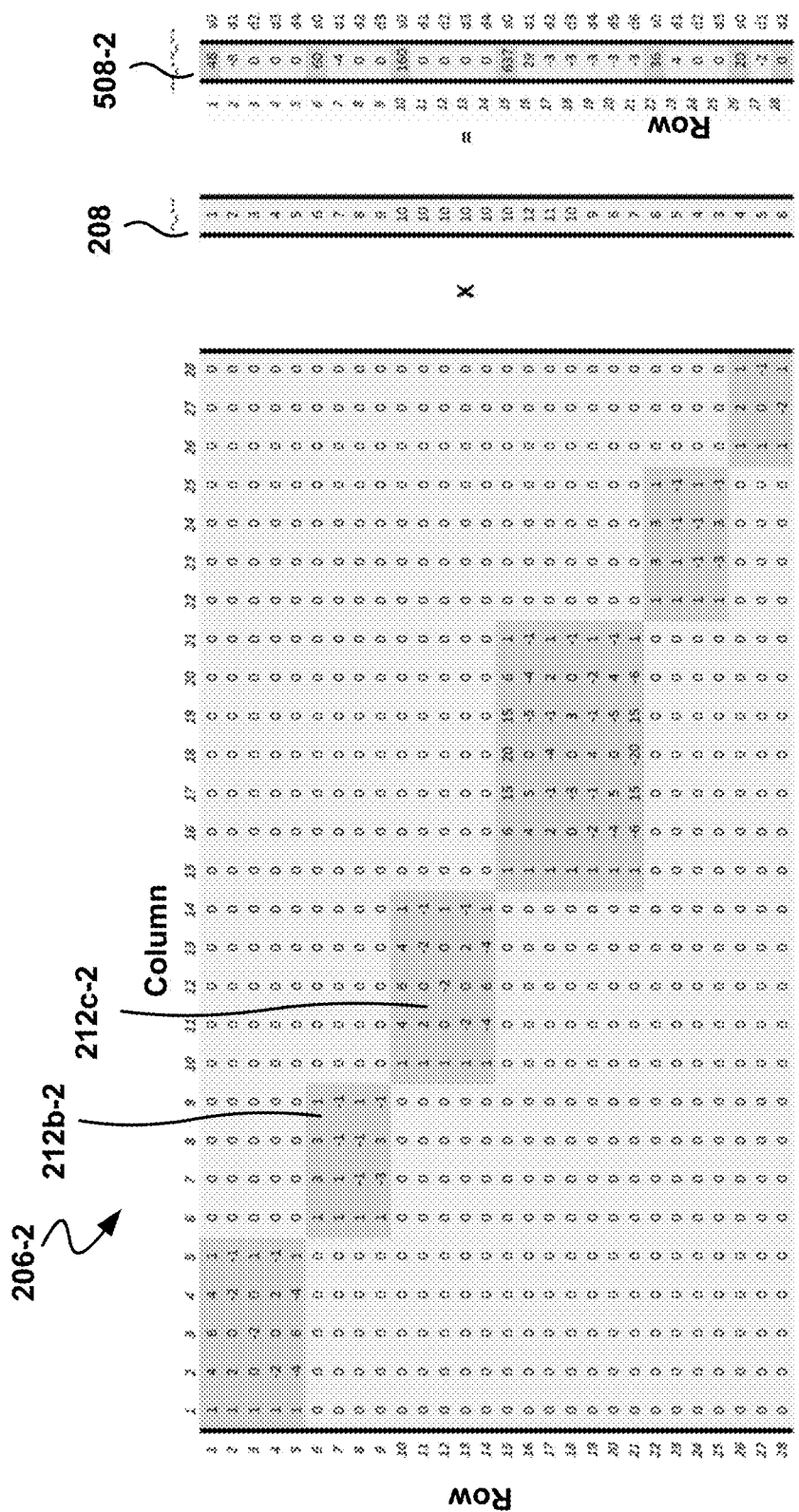

Now, referring to FIG. 7, another example multiplier matrix 206-2 is shown. The multiplier matrix 206-2 is similar to multiplier matrix 206 shown in FIG. 3, except that one or more of the sub matrix dimensions are different. In this example, the sub matrix 212b-2 has a dimension of 4×4 and the sub matrix 212C-2 has a dimension of 5×5. The multiplier matrix 206-2 is matrix multiplied with the original data matrix 208 to generate an interim modified original data matrix 508-2. FIG. 7A shows various weighted average coefficients and differential coefficients of the interim modified original data matrix 508-2 and the corresponding aggregate energy of the interim modified original data matrix 508-2. In this example, the aggregate energy of the interim modified original data matrix 508-2 is 2.69. Further, number of zeros in the interim modified original data matrix 508-2 is 12.

Figure 8:
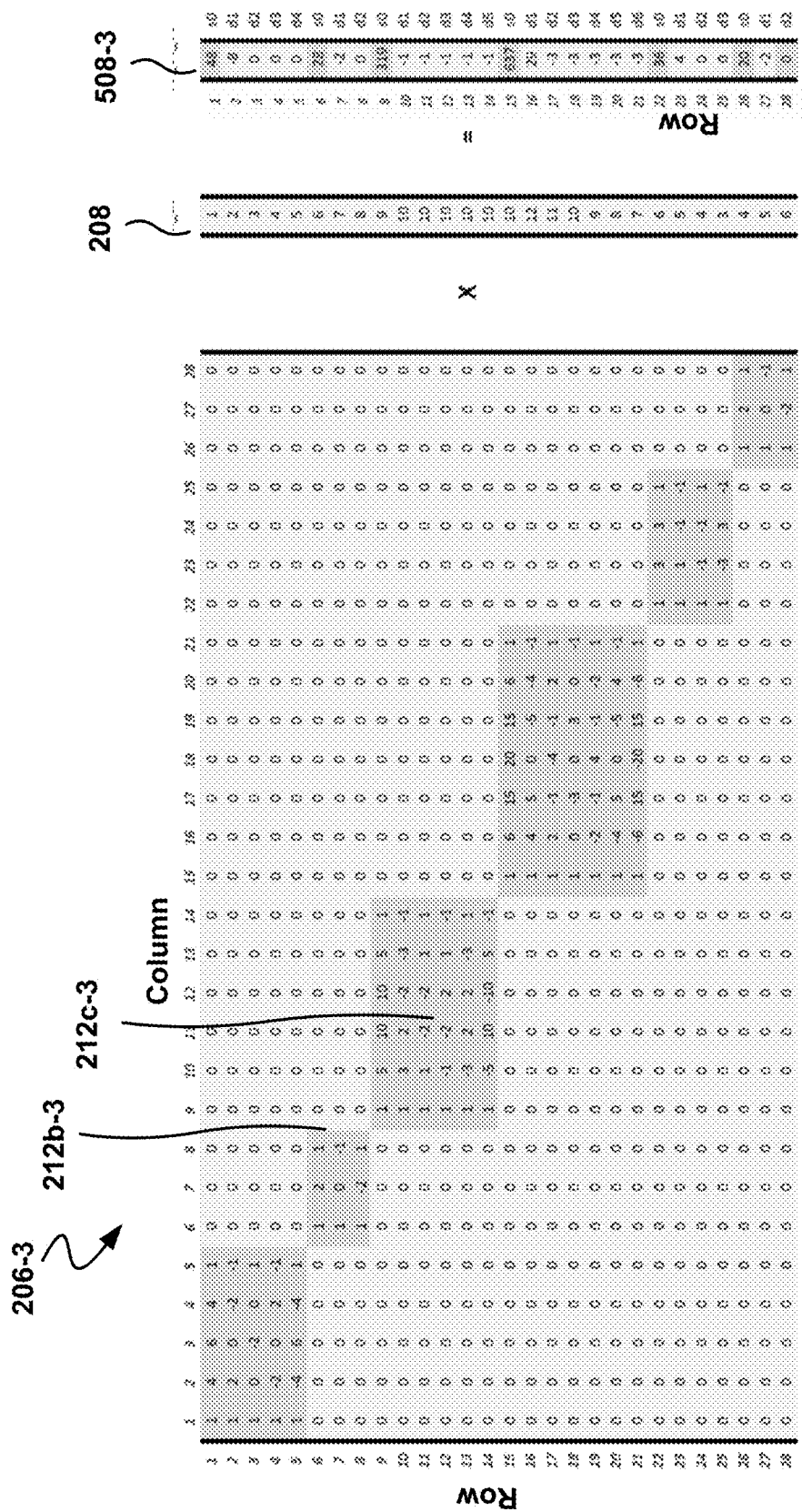
Figure 8A:

Now, referring to FIG. 8, another example multiplier matrix 206-3 is shown. The multiplier matrix 206-3 is similar to multiplier matrix 206 shown in FIG. 3, except that one or more of the sub matrix dimensions are different. In this example, the sub matrix 212b-3 has a dimension of 3×3 and the sub matrix 212C-3 has a dimension of 6×6. The multiplier matrix 206-3 is matrix multiplied with the original data matrix 208 to generate an interim modified original data matrix 508-3. FIG. 8A shows various weighted average coefficients and differential coefficients of the interim modified original data matrix 508-3 and the corresponding aggregate energy of the interim modified original data matrix 508-3. In this example, the aggregate energy of the interim modified original data matrix 508-3 is 2.84. Further, number of zeros in the interim modified original data matrix 508-3 is 7.

Figure 9:
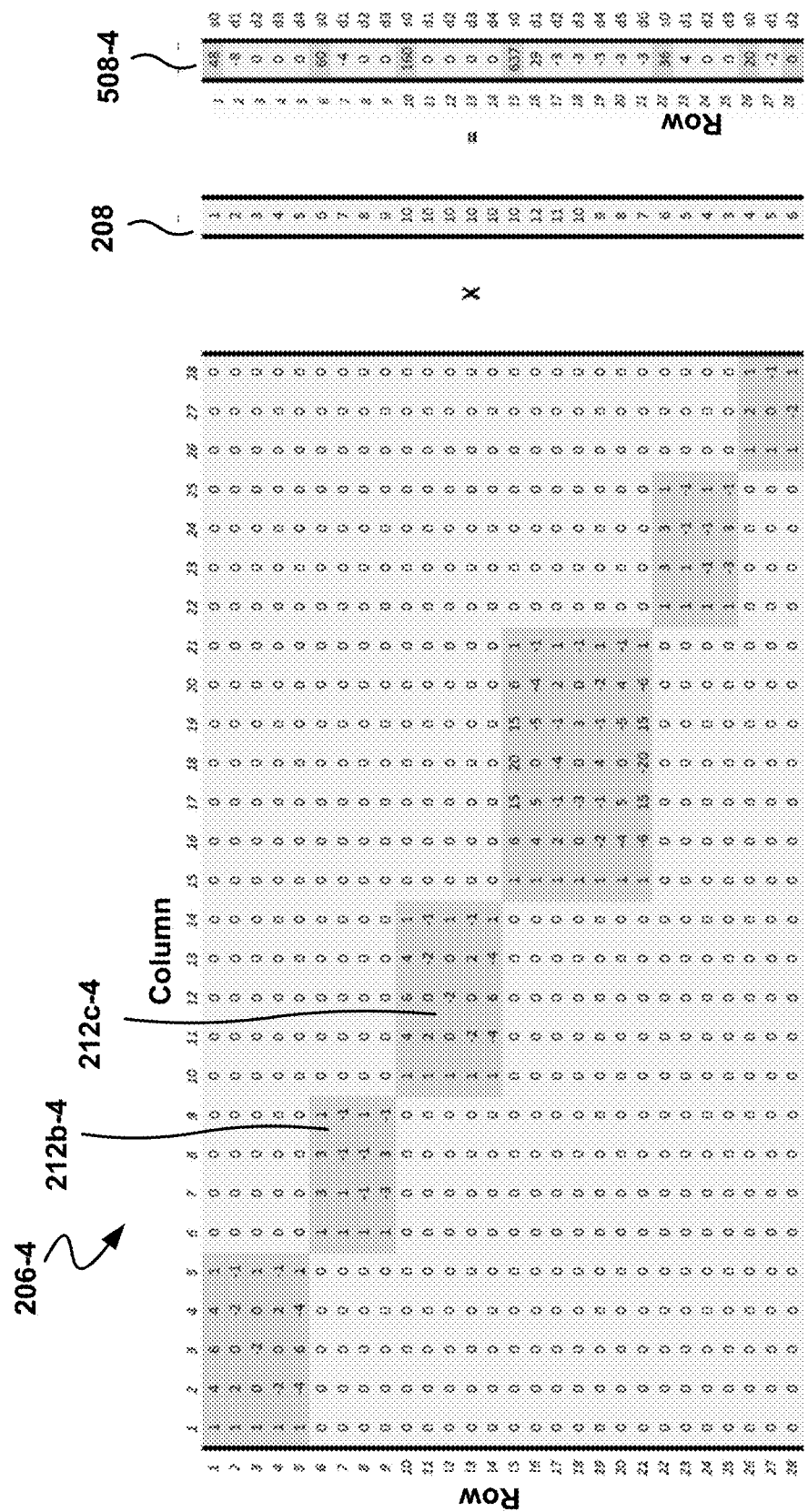

Now, referring to FIG. 9, yet another example multiplier matrix 206-4 is shown. The multiplier matrix 206-4 is similar to multiplier matrix 206 shown in FIG. 3, except that one or more of the sub matrix dimensions are different. In this example, the sub matrix 212b-4 has a dimension of 4×4 and the sub matrix 212C-4 has a dimension of 5×5. The multiplier matrix 206-4 is matrix multiplied with the original data matrix 208 to generate an interim modified original data matrix 508-4. FIG. 9A shows various weighted average coefficients and differential coefficients of the interim modified original data matrix 508-4 and the corresponding aggregate energy of the interim modified original data matrix 508-4. In this example, the aggregate energy of the interim modified original data matrix 508-4 is 2.69. Further, number of zeros in the interim modified original data matrix 508-4 is 12.

Figure 10:
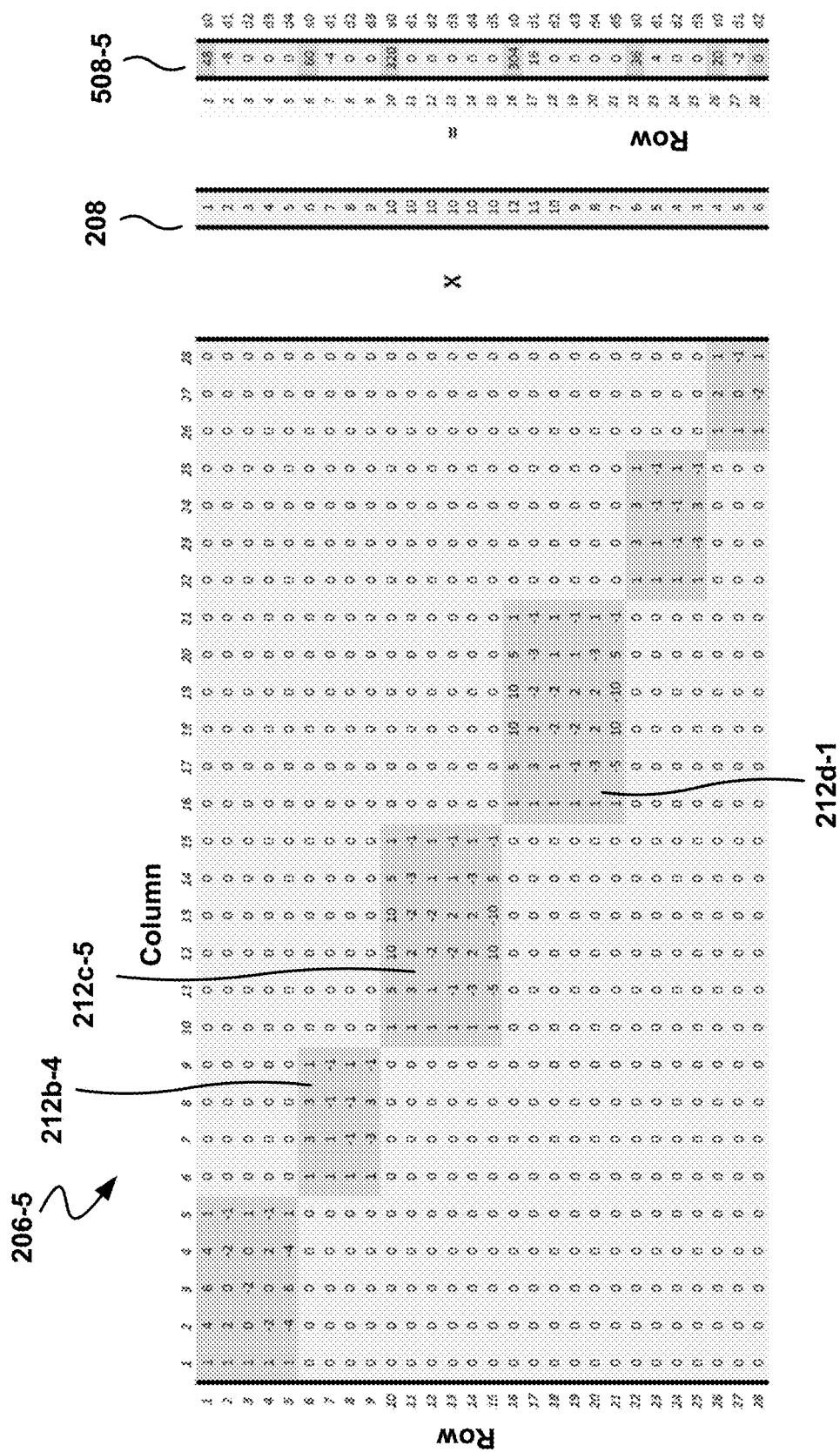

Now, referring to FIG. 10, yet another example multiplier matrix 206-5 is shown. The multiplier matrix 206-5 is similar to multiplier matrix 206 shown in FIG. 3, except that one or more of the sub matrix dimensions are different. In this example, the sub matrix 212b-4 has a dimension of 4×4, the sub matrix 212C-5 has a dimension of 6×6 and the sub matrix 212d-1 has a dimension of 6×6. The multiplier matrix 206-5 is matrix multiplied with the original data matrix 208 to generate an interim modified original data matrix 508-5. FIG. 10A shows various weighted average coefficients and differential coefficients of the interim modified original data matrix 508-5 and the corresponding aggregate energy of the interim modified original data matrix 508-5. In this example, the aggregate energy of the interim modified original data matrix 508-5 is 2.5. Further, number of zeros in the interim modified original data matrix 508-1 is 17.

Figure 11:
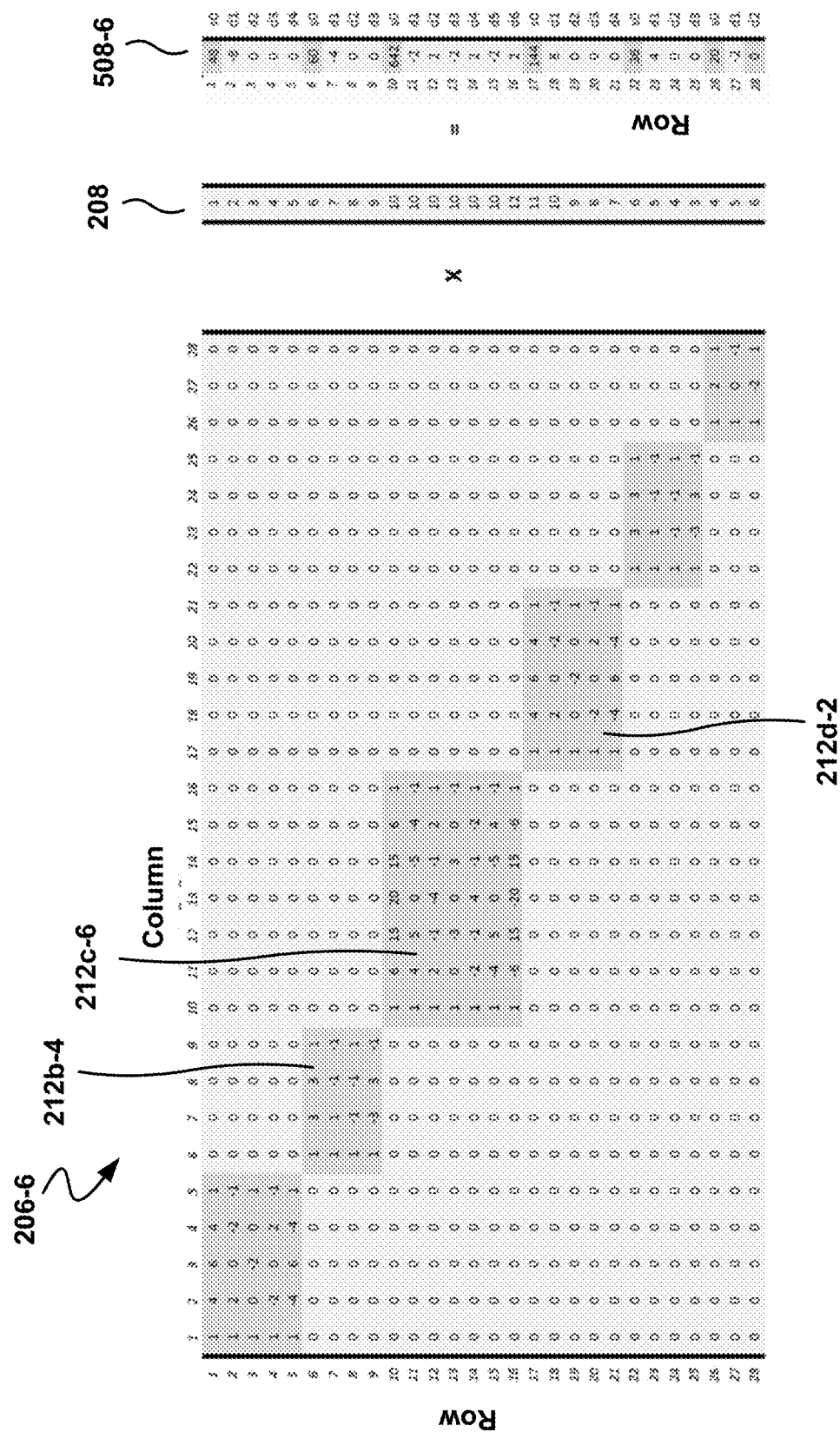

Now, referring to FIG. 11, yet another example multiplier matrix 206-6 is shown. The multiplier matrix 206-6 is similar to multiplier matrix 206 shown in FIG. 3, except that one or more of the sub matrix dimensions are different. In this example, the sub matrix 212b-4 has a dimension of 4×4, the sub matrix 212C-6 has a dimension of 7×7 and the sub matrix 212d-2 has a dimension of 5×5. The multiplier matrix 206-6 is matrix multiplied with the original data matrix 208 to generate an interim modified original data matrix 508-6. FIG. 11A shows various weighted average coefficients and differential coefficients of the interim modified original data matrix 508-6 and the corresponding aggregate energy of the interim modified original data matrix 508-6. In this example, the aggregate energy of the interim modified original data matrix 508-6 is 2.69. Further, number of zeros in the interim modified original data matrix 508-1 is 11.

In one example, various computed aggregate energy is stored in the energy data store. The energy compare engine compares various computed aggregate energy and selects the interim modified original data matrix with least amount of aggregate energy as the modified original data matrix. In this example, the interim modified original data matrix 508-5 is selected as the modified original data matrix 210, based on the aggregate energy of 2.5, as described with reference to FIGS. 10 and 10A. Further, we notice that the interim modified original data matrix 508-5 has 17 zeros, which is more desirable for compression than interim modified original data matrices 508-1, 508-2, 508-3, 508-4 and 508-6. The dimensions of the sub matrix for the multiplier matrix 206-5 is selectively ordered to generate a corresponding encryption key for the modified original data matrix, as previously described with reference to FIG. 3. In this example, the sequential order of the dimensions of the multiplier matrix 206-5 is 5, 4, 6, 6, 4 and 3.

Decryption

Figure 12:
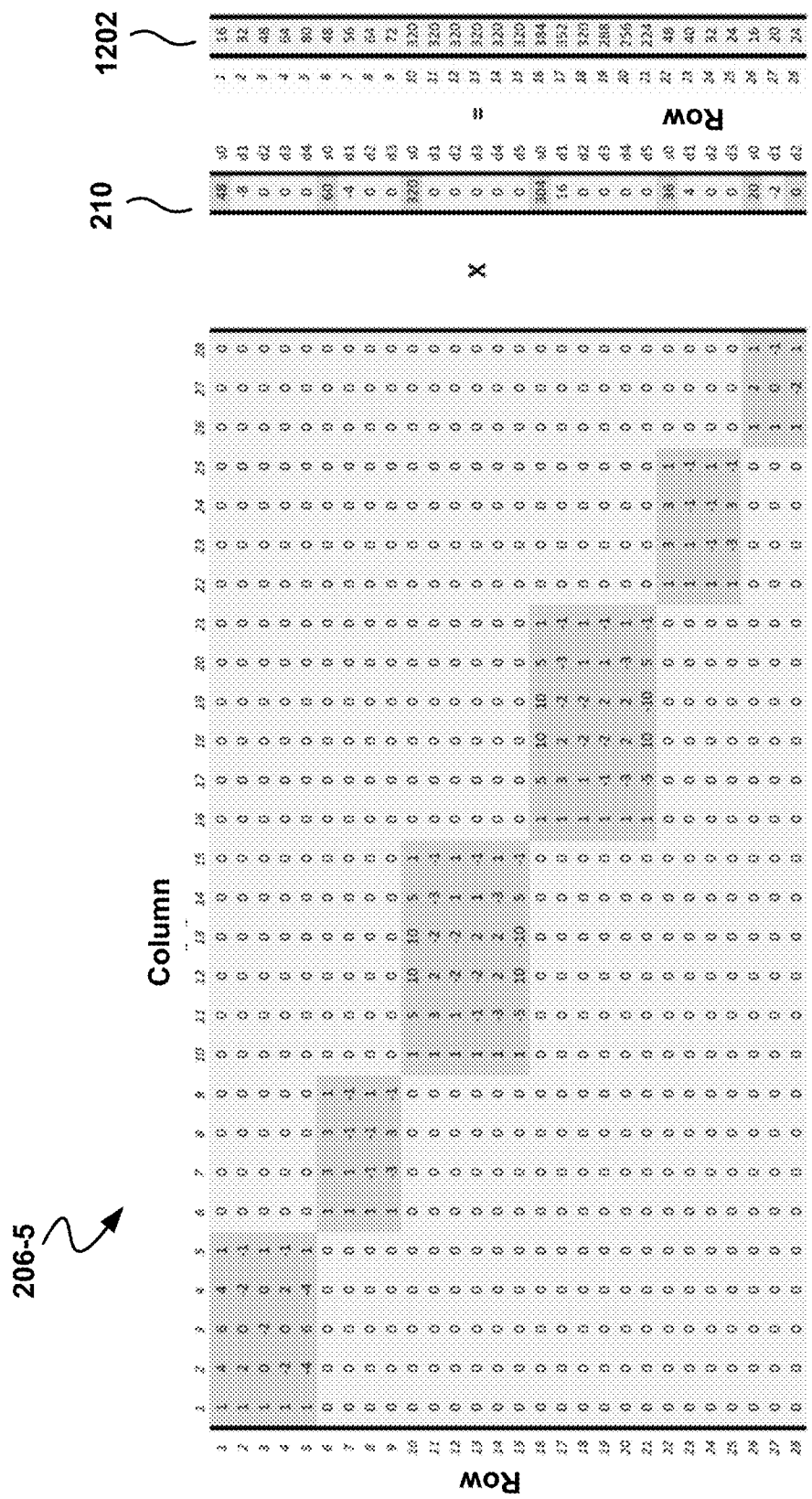
FIG. 12 shows another example multiplier matrix, modified original data matrix and corresponding interim original data matrix, according to an aspect of the present disclosure.

Now, referring to FIGS. 12 and 12A, an example decryption of the modified original data matrix of FIG. 10 will be described. In this example, the modified original data matrix 210 corresponds to the interim modified original data matrix 508-5. As previously described, the encryption key will provide the dimensions of the sub matrices used to generate the multiplier matrix. In this example, the sequential order of the dimensions of the multiplier matrix 206-5 is 5, 4, 6, 6, 4 and 3. Based on this information, the multiplier matrix 206-5 will be regenerated, as shown in FIG. 12. The multiplier matrix 206-5 is matrix multiplied with modified original data matrix 210 to generate an interim original data matrix 1202.

In one example, the interim original data matrix 1202 has weighted average coefficient and differential coefficient components that are scaled by $2^{(N-1)}$ where N is the corresponding dimension of the sub matrices. In order to retrieve the original data matrix 208 from the interim original data matrix 1202, each of the weighted average coefficients and the differential coefficients have to be divided by $2^{(N-1)}$, where N is the corresponding square of the corresponding dimension of the sub matrices.

For example, elements E 1,1 to E 5,1 are divided by $2^{(N-1)}$, where N is equal to 5, in other words, by $2^{(5-1)}=2^4=16$. Similarly, elements E 6,1 to E 9,1 are divided by $2^{(N-1)}$, where N is equal to 4, in other words, by $2^{(4-1)}=2^3=8$. And, elements E 10,1 to E 15,1 are divided by $2^{(N-1)}$, where N is equal to 5, in other words, by $2^{(6-1)}=2^5=32$. Elements E 16,1 to E 21,1 are divided by $2^{(N-1)}$, where N is equal to 5, in other words, by $2^{(6-1)}=2^5=32$. Elements E 22-1 to E 25,1 are divided by $2^{(N-1)}$, where N is equal to 4, in other words, by $2^{(4-1)}=2^3=8$. And, elements E 26-1 to E 28-1 are divided by $2^{(N-1)}$, where N is equal to 3, in other words, by $2^{(3-1)}=2^2=4$. Selective division of the weighted average coefficients and differential coefficients will generate the original data matrix 208.

Data Inflation:

In some examples, each of the elements of the matrix may be represented using a predefined number of bits, however, the matrix multiplication may result in elements of the matrix which may require more number of bits than the predefined number of bits. This may be sometimes referred to as data inflation. In some examples, it may be desirable to keep the number of bits required to represent the elements of the matrix within a predefined number of bits. An example implementation to avoid data inflation will now be described. This example uses Galois Field arithmetic (sometimes referred to as GF). The Galois Field arithmetic is sometimes referred to as finite field arithmetic. The Galois Field arithmetic operate on input vectors of a given word width, say 24-bit such that the output data vectors never exceed the input word width and linear transforms such as matrix multiplication are reversible.

Now, referring to FIG. 13, an example sub matrix multiplication which demonstrates data inflation is shown. FIG. 13 shows an example binomial sub matrix 1302 of the size 5×5. The sub matrix 1302 may be part of a multiplier matrix as previously described. In one example, the sub matrix 1302 corresponds to sub matrix 212a shown and described in FIG. 6, which is the same sub matrix shown in FIGS. 7, 8, 9, 10, 11 and 12. Another example original data matrix 1304 is also shown. In this example, elements of both the sub matrix 1302 and original data matrix may be represented as binary numbers with 8 bits of data. The sub matrix 1302 is multiplied with the original data matrix 1304 to generate an example output matrix 1306. As one skilled in the art appreciates, some of the elements of the resulting output matrix 1306 require more than 8 bits to represent them as binary numbers. For example, all the elements of the output matrix 1306, except the element with a value of 78 require more than 8 bits to be represented as a binary number. In other words, the matrix multiplication resulted in a data inflation. In one example, the output matrix 1306 represents a modified original data matrix.

Figure 14A:
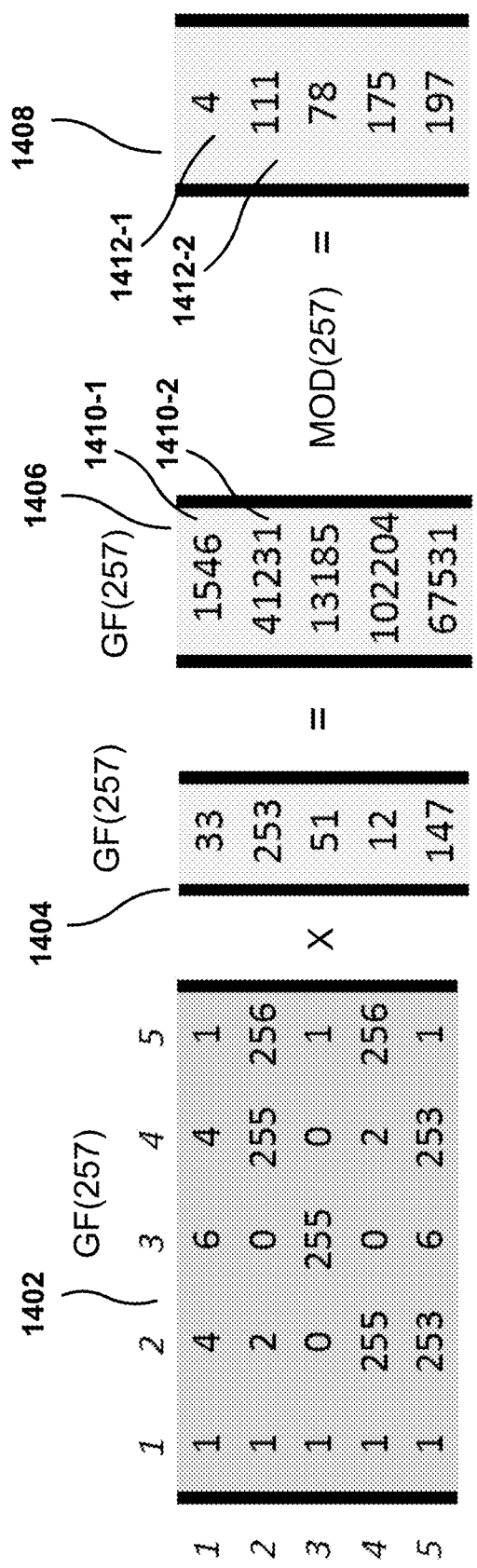
FIGS. 14A and 14B show an example encryption and decryption of the sub matrix of FIG. 13 using Galois Field arithmetic, according to an aspect of the present disclosure.
Figure 14B:
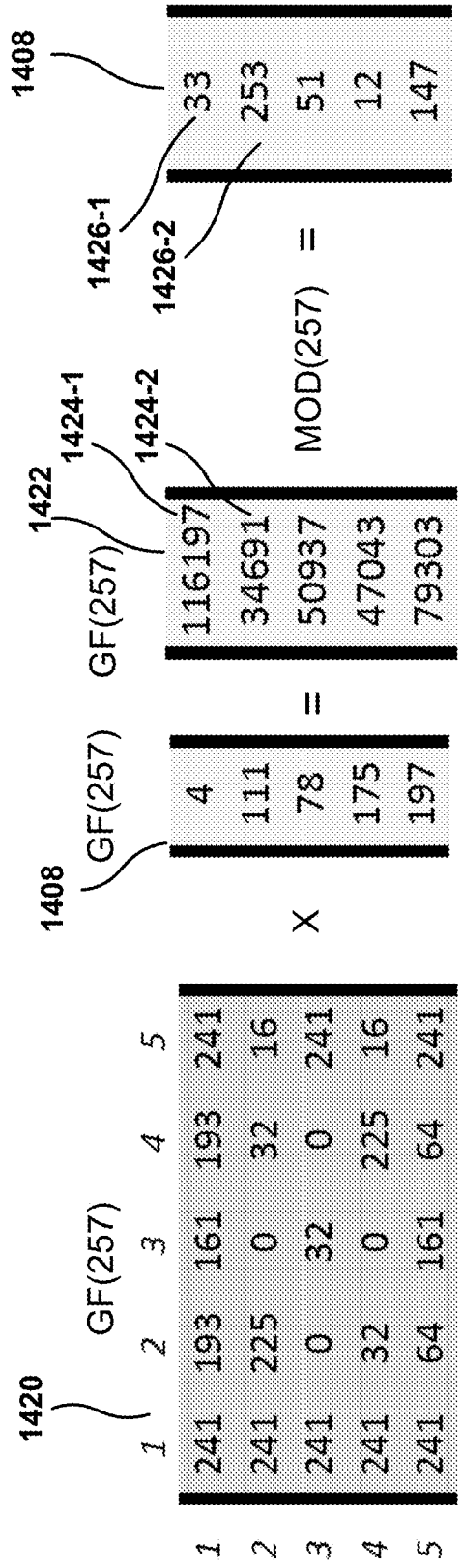

Now, referring to FIGS. 14A and 14B, an example encryption and decryption using Galois Field arithmetic of the order GF(K), where K is an integer prime number is described. Referring to FIG. 14A, example sub matrix 1302 described with reference to FIG. 13 is shown as sub matrix 1402, in GF(257). In this example, K is equal to 257. In a GF(257) Galois Field arithmetic, as one skilled in the art appreciates, both positive and negative numbers are represented between 0 to 256. For example, 1 is represented as 1, 4 is represented as 4, −1 is represented as 256, −2 is represented as 255, and −4 is represented as 253. In general, a positive number "p" is represented as "p" and a negative number "−p" is represented as "257−p" in a GF(257) representation.

The original data matrix 1404 is also represented in GF(257), which is same as the data matrix 1304 shown in FIG. 13. When the sub matrix 1402 is multiplied by the original data matrix 1404, an interim output matrix 1406 is generated. Each element of the interim output matrix 1406 is divided by 257 and remainder is represented in the output matrix 1408. As one skilled in the art appreciates, this step is generally referred to as a "modulo(257)" operation. For example, referring to element 1410-1 of interim output matrix 1406 with a value of 1546 is divided by 257, which results in a remainder of 4. In other words, (1546−6×257)=4. So, the value of the element 1412-1 of output matrix 1408 is 4. Similarly, referring to element 1410-2 of interim output matrix 1406 with a value of 41231 is divided by 257, which results in a remainder of 111. In other words, (41231−160×257)=111. So, the value of the element 1412-2 of output matrix 1408 is 111.

As one skilled in the art appreciates, the output matrix 1408 has elements can be represented in binary number, with 8 bits of data. Also, the output matrix 1408 is obfuscated as compared to the original data matrix 1404, as the elements of the output matrix 1408 is different than the elements of the original data matrix 1404. In one example, the output matrix 1408 represents a modified original data matrix.

Now, referring to FIG. 14B, an example decryption of the output matrix 1408 represented in GF(257) will be described. Referring to FIG. 14B, inverse sub matrix 1420 is shown in GF(257), As one skilled in the art appreciates, the inverse sub matrix 1420 is an inverse matrix of the sub matrix 1402. In other words, multiplying the sub matrix 1402 with inverse sub matrix 1420 will result in an identity matrix. An identity matrix of the size P×P will have a plurality of elements $E_{i,j}$, where (i=1 to P) and (j=1 to P). And, each of the elements $E_{1,1}$, $E_{2,2}$, ... $E_{P,P}$ will be equal to 1 and all other elements will be equal to zero.

The inverse sub matrix 1402 is multiplied by the output matrix 1408 to generate an interim original data matrix 1422. A "modulo(257)" operation is performed on each of the elements of the interim original data matrix 1422 to derive the original data matrix 1404. For example, referring to element 1424-1 of interim original data matrix 1422 with a value of 116197 is divided by 257, which results in a remainder of 33. In other words, (116197−452×257)=33. So, the value of the element 1426-1 of original data matrix 1404 is 33. Similarly, referring to element 1424-2 of interim original data matrix 1422 with a value of 34691 is divided by 257, which results in a remainder of 253. In other words, (34691−134×257)=253. So, the value of the element 1426-2 of original data matrix 1404 is 253.

As one skilled in the art appreciates, above example is described with reference to a sub matrix for simplicity. However, a multiplier matrix with a plurality of sub matrices may also be represented using the Galois Field arithmetic and used to perform encryption and decryption as described above.

As one skilled in the art appreciates, as described above, by using finite field arithmetic (or Galois Field arithmetic), potential for data inflation can be avoided. Although example has been described with reference to a Galois Field arithmetic, other arithmetic operations can be advantageously used to minimize or eliminate data inflation during matrix multiplication.

Figure 15:
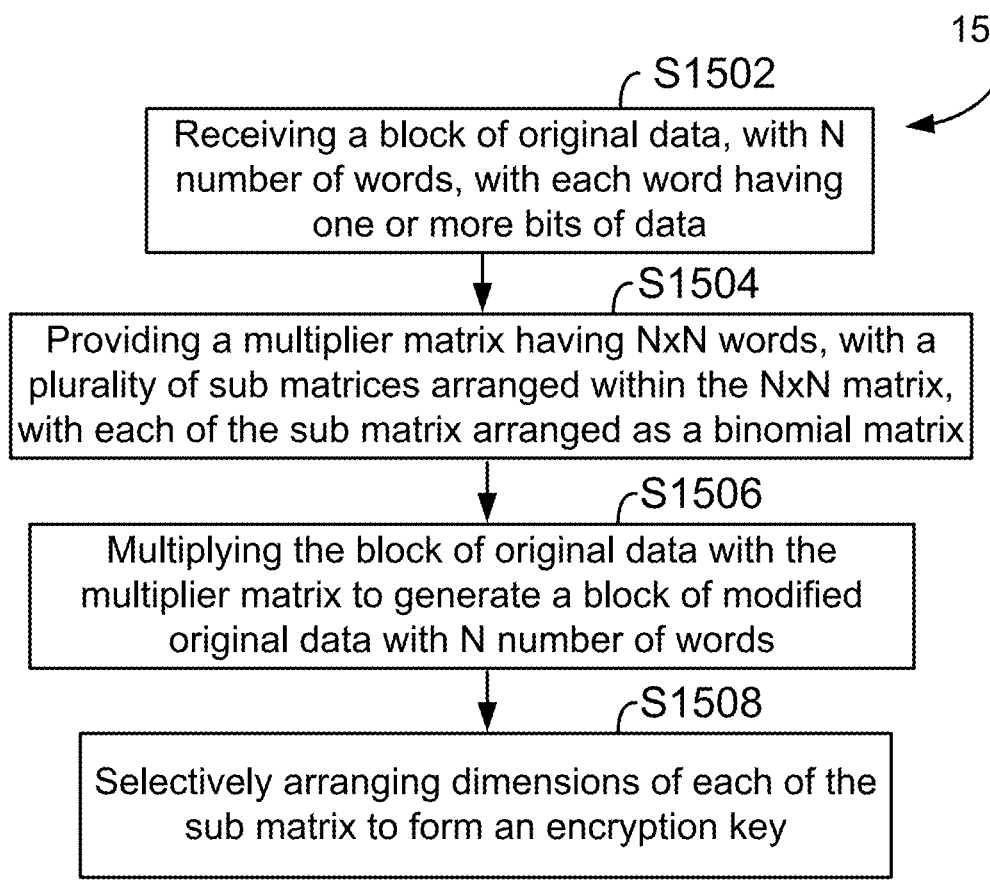
FIG. 15 shows an example flow diagram to encrypt a block of data, according to an aspect of the present disclosure.

Now, referring to FIG. 15, an example flow diagram 1500 is described, to encrypt a block of original data. In block S1502, a block of original data, with N number of words, with each word having one or more bits of data is received. For example, the encryption system 100 of FIG. 1 receives the block of original data. For example, the receiver 102 of the encryption system 100 receives the block of original data.

In block S1504, a multiplier matrix having N×N words, with a plurality of sub matrices arranged within the N×N matrix, with each of the sub matrix arranged as a binomial matrix is generated. For example, the encryption engine 104 of the encryption engine generates the multiplier matrix. The sub matrix generator 202 of the encryption engine generates the multiplier matrix 206.

In block S1506, the block of original data is multiplied with the multiplier matrix to generate a block of modified original data with N number of words. For example, the encryption engine 104 of the encryption system 100 multiplies the block of original data with the multiplier matrix to generate a block of modified original data with N number of words. For example, the matrix multiplier 204 receives the multiplier matrix 206 and the original data matrix 208. The multiplier matrix 204 multiplies the multiplier matrix 206 and the original data matrix 208 to generate the modified original matrix 210.

In block S1508, the dimensions of each of the sub matrix is selectively arranged to form an encryption key. In some examples, the encryption key refers to the sub matrix key. In one example, the sub matrix generator 202 may generate the sub matrix key 212. In some examples, the sub matrix key 212 may be obfuscated.

Figure 15A:
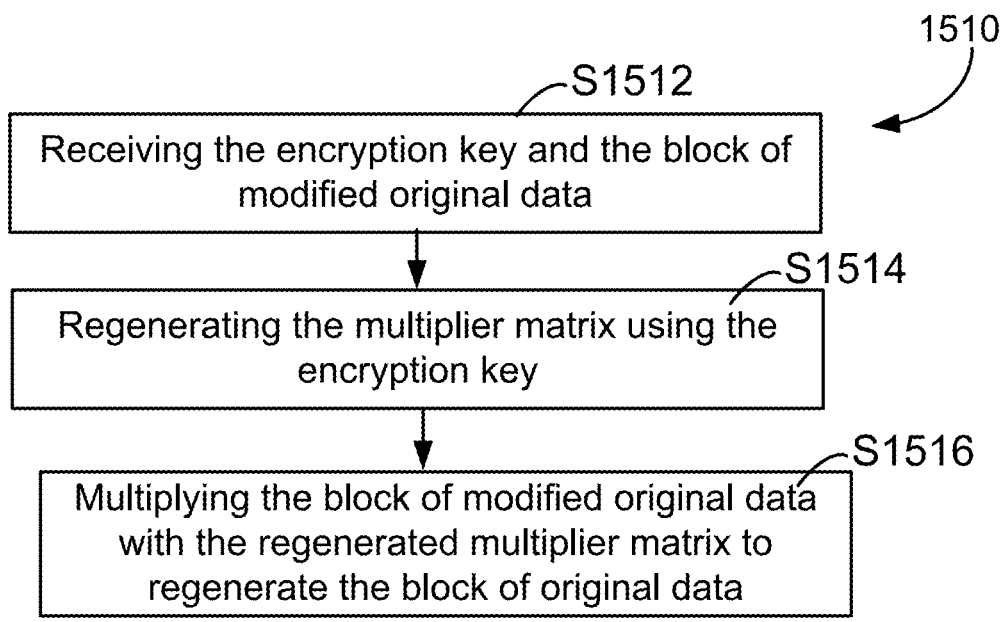
FIG. 15A shows an example flow diagram to decrypt a block of encrypted data, according to an aspect of the present disclosure.

Now, referring to FIG. 15A, an example flow diagram 1510 is described, to decrypt a block of modified original data. In block S1512, encryption key and block of modified original data is received. For example, receiver 102 of the encryption system 100 may receive the block of modified original data 210. In one example, the receiver 100 may also receive the encryption key, for example, the sub matrix key 212.

In block S1514, the multiplier matrix is regenerated using the encryption key. In one example, the matrix generator 214 of the decryption engine 122 may receive the encryption key and using the encryption key, regenerate the multiplier matrix 206.

In block S1516, the block of modified original data is multiplied with the regenerated multiplier matrix to regenerate the block of original data. In one example, the matrix multiplier 204 multiplies the regenerated multiplier matrix 206 with the modified original data 210 to regenerate the block of original data 208. The regenerated block of original data 208 is then transmitted by the transmitter 110 to the destination computing device.

The embodiments disclosed herein can be implemented through at least one software program running on at least one hardware device and performing various functions of the encryption system. Various functions of the encryption system as described herein can be at least one of a hardware device, or a combination of hardware device and software module. One or more components of the encryption system may be executed separately. For example, the encryption engine may be run in one system and the decryption engine may be run in a different system.

The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means, and at least one software means. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method to encrypt a block of data comprising:
   retrieving a block of original data from a data store by a receiver, block of original data including a N number of words, each word including one or more bits of data;
   providing a sub matrix generator executed in an encryption system executed on a computing system with at least one processor and memory, the sub matrix generator generating a multiplier matrix, the multiplier matrix having N×N words, a plurality of sub matrices arranged diagonally within the multiplier matrix, with each of the sub matrix arranged as a binomial matrix, and all the words in the multiplier matrix not part of the sub matrix arranged as a binomial matrix set to zero;
   multiplying the block of original data with the generated multiplier matrix by a matrix multiplier executed in the encryption system to generate a block of modified original data with N number of words, wherein the block of modified original data is indicative of an anonymized block of original data.

2. The method of claim 1, further including selectively arranging the dimensions of each of the sub matrix to form an encryption key.

3. The method of claim 2, further including
   regenerating the multiplier matrix by a matrix generator using the encryption key;
   multiplying the block of modified original data with the generated multiplier matrix by the matrix multiplier to regenerate the block of original data from the block of modified original data.

4. The method of claim 1, wherein the block of modified original data is divided into a plurality of sub blocks, the size of the sub blocks corresponding to the dimensions of each of the sub matrix, with each of the sub blocks having a weighted coefficient word and one or more differential coefficient word, a sum of the modulus of all of the differential coefficient words divided by the number of differential coefficient words indicative of an aggregate energy of the block of modified original data.

5. The method of claim 4, further including:
   generating a plurality of multiplier matrix by selectively changing the dimensions of one or more of the sub matrix;
   multiplying the block of original data with the generated plurality of multiplier matrix to generate a plurality of interim modified original data matrix;
   calculating aggregate energy for each of the generated plurality of interim modified original data matrix; and
   selectively designating one of the interim modified original data matrix with minimal aggregate energy as the modified original data matrix.

6. The method of claim 5, further including selectively arranging the dimensions of each of the sub matrix corresponding to the multiplier matrix that generated minimal aggregate energy to form an encryption key.

7. The method of claim 6, further including
   regenerating the multiplier matrix by a matrix generator by using the encryption key; and
   multiplying the modified original data matrix with the multiplier matrix by the matrix multiplier to regenerate the block of original data from the block of modified original data.

8. The method of claim 1,
   wherein each of the sub matrices of the multiplier matrix arranged as a binomial matrix are represented using a Galois Field arithmetic of the order GF(K), where K is an integer prime number;
   wherein the original data is represented using the Galois Field arithmetic of the order GF(K);
   wherein multiplying the original data with the multiplier matrix generating an interim output matrix; and
   performing a modulo(K) operation for each of the elements of the interim output matrix to generate a matrix of modified original data, modified original data representative of the original data.

9. The method of claim 8, further including:
   multiplying an inverse of the multiplier matrix with the matrix of modified original data to generate an interim original data matrix; and
   performing a modulo(K) operation for each of the elements of the interim original data matrix to generate the matrix of original data.

10. The method of claim 1, wherein the block of original data is indicative of an audio or visual data.

11. A system to encrypt a block of data, comprising:
    an encryption system executed on a computing system with at least one processor and memory, the encryption system including
    a receiver configured to retrieve a block of original data from a data store, block of original data including a N number of words, each word including one or more bits of data;
    a sub matrix generator configured to generate a multiplier matrix, the multiplier matrix having N×N words, a plurality of sub matrices arranged diagonally within the multiplier matrix, with each of the sub matrix arranged as a binomial matrix, and all the words in the multiplier matrix not part of the sub matrix arranged as a binomial matrix set to zero;
    a matrix multiplier configured to multiply the block of original data with the generated multiplier matrix to generate a block of modified original data with N number of words, wherein the block of modified original data is indicative of an anonymized block of original data.

12. The system of claim 11, wherein the block of original data is indicative of an audio or visual data.

13. The system of claim 11, further configured to selectively arrange the dimensions of each of the sub matrix to form an encryption key.

14. The system of claim 13, further including
    a matrix generator configured to regenerate the multiplier matrix using the encryption key; and the matrix multiplier configured to multiply the block of modified original data with the generated multiplier matrix to regenerate the block of original data from the block of modified original data.

15. The system of claim 11, wherein the block of modified original data is divided into a plurality of sub blocks, the size of the sub blocks corresponding to the dimensions of each of the sub matrix, with each of the sub blocks having a weighted coefficient word and one or more differential coefficient word, a sum of the modulus of all of the differential coefficient words divided by the number of differential coefficient words indicative of an aggregate energy of the block of modified original data.

16. The system of claim 15, further configured to
generate a plurality of multiplier matrix by selectively changing the dimensions of one or more of the sub matrix;
multiply the block of original data with the generated plurality of multiplier matrix to generate a plurality of interim modified original data matrix;
calculate aggregate energy for each of the generated plurality of interim modified original data matrix; and
selectively designate one of the interim modified original data matrix with minimal aggregate energy as the modified original data matrix.

17. The system of claim 16, further configured to selectively arrange the dimensions of each of the sub matrix corresponding to the multiplier matrix that generated minimal aggregate energy to form an encryption key.

18. The system of claim 17, further including
a matrix generator configured to regenerate the multiplier matrix by using the encryption key;
the matrix multiplier configured to multiply the modified original data matrix with the generated multiplier matrix to regenerate the block of original data from the block of modified original data.

19. The system of claim 11,
wherein each of the sub matrices of the multiplier matrix arranged as a binomial matrix are represented using a Galois Field arithmetic of the order GF(K), where K is an integer prime number;
wherein the original data is represented using the Galois Field arithmetic of the order GF(K);
wherein the original data is multiplied with the multiplier matrix to generate an interim output matrix; and
a modulo(K) operation is performed for each of the elements of the interim output matrix to generate a matrix of modified original data, modified original data representative of the original data.

20. The system of claim 19, further including:
an inverse of the multiplier matrix is multiplied with the matrix of modified original data to generate an interim original data matrix; and
a modulo(K) operation is performed for each of the elements of the interim original data matrix to generate the matrix of original data.

* * * * *